June 3, 1952  H. L. WUNDERLY  2,599,309
ANIMAL FORM ATTACHMENT FOR BICYCLES
Filed April 16, 1951  3 Sheets-Sheet 2
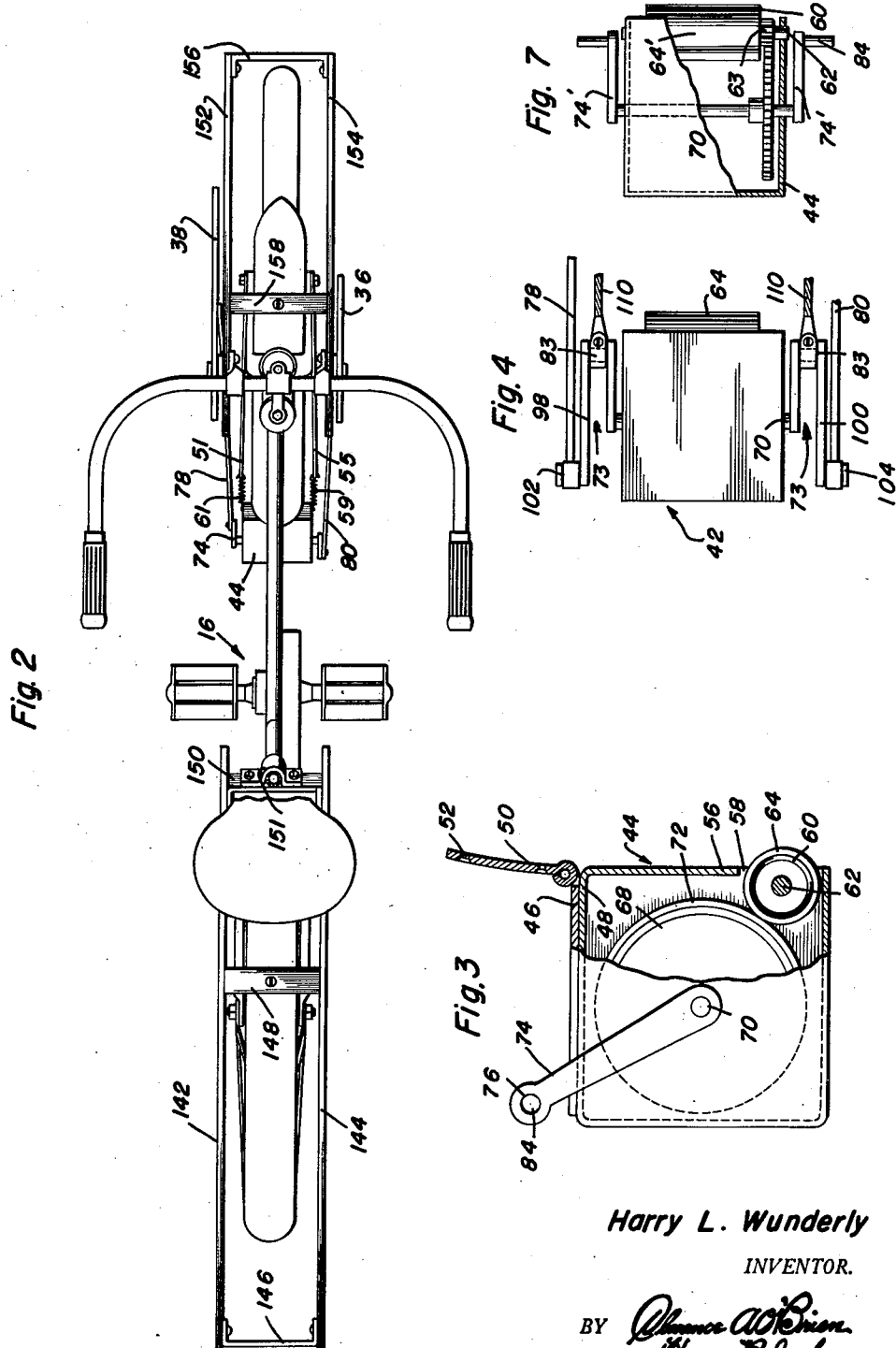
Harry L. Wunderly
INVENTOR.

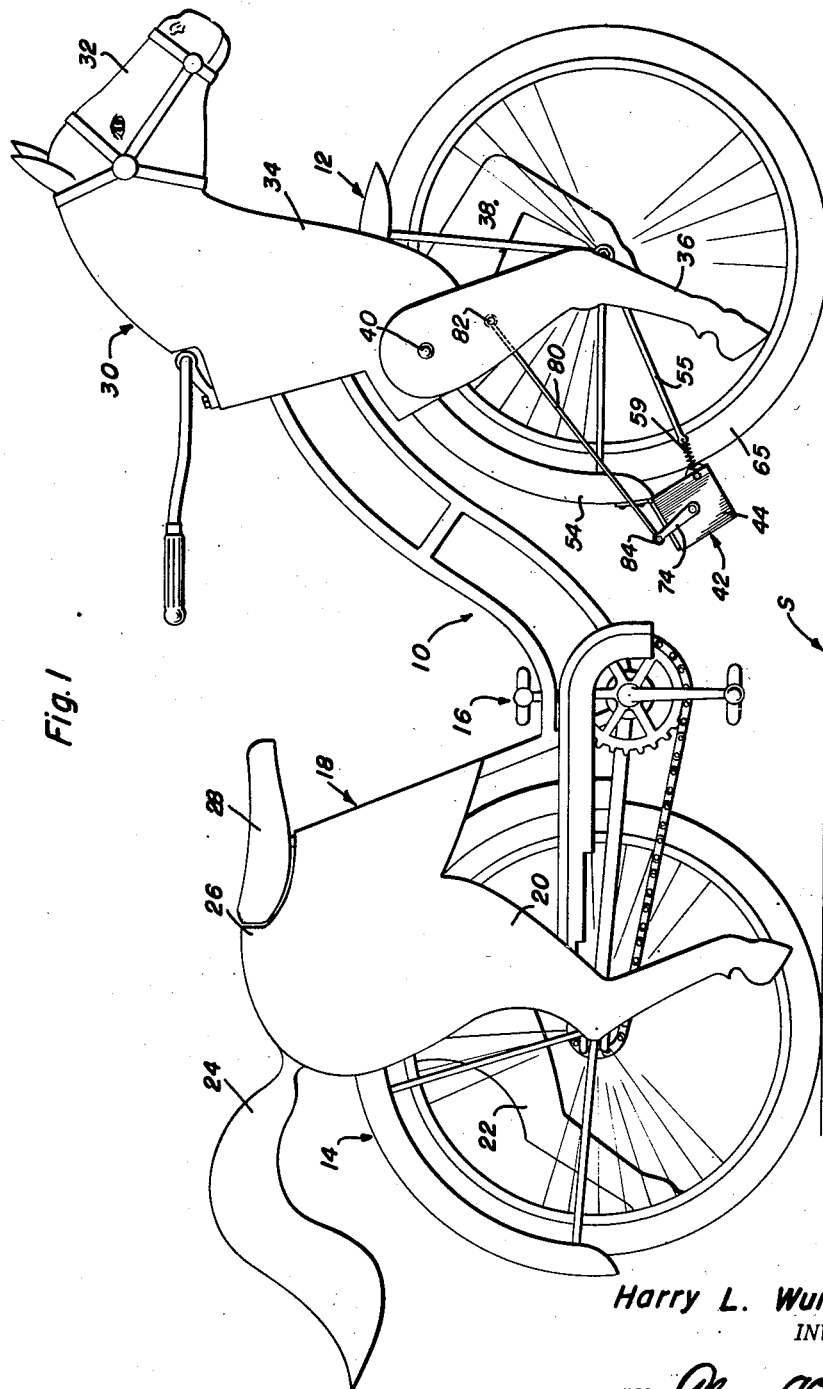
Harry L. Wunderly
INVENTOR.

June 3, 1952 — H. L. WUNDERLY — 2,599,309
ANIMAL FORM ATTACHMENT FOR BICYCLES
Filed April 16, 1951 — 3 Sheets-Sheet 3
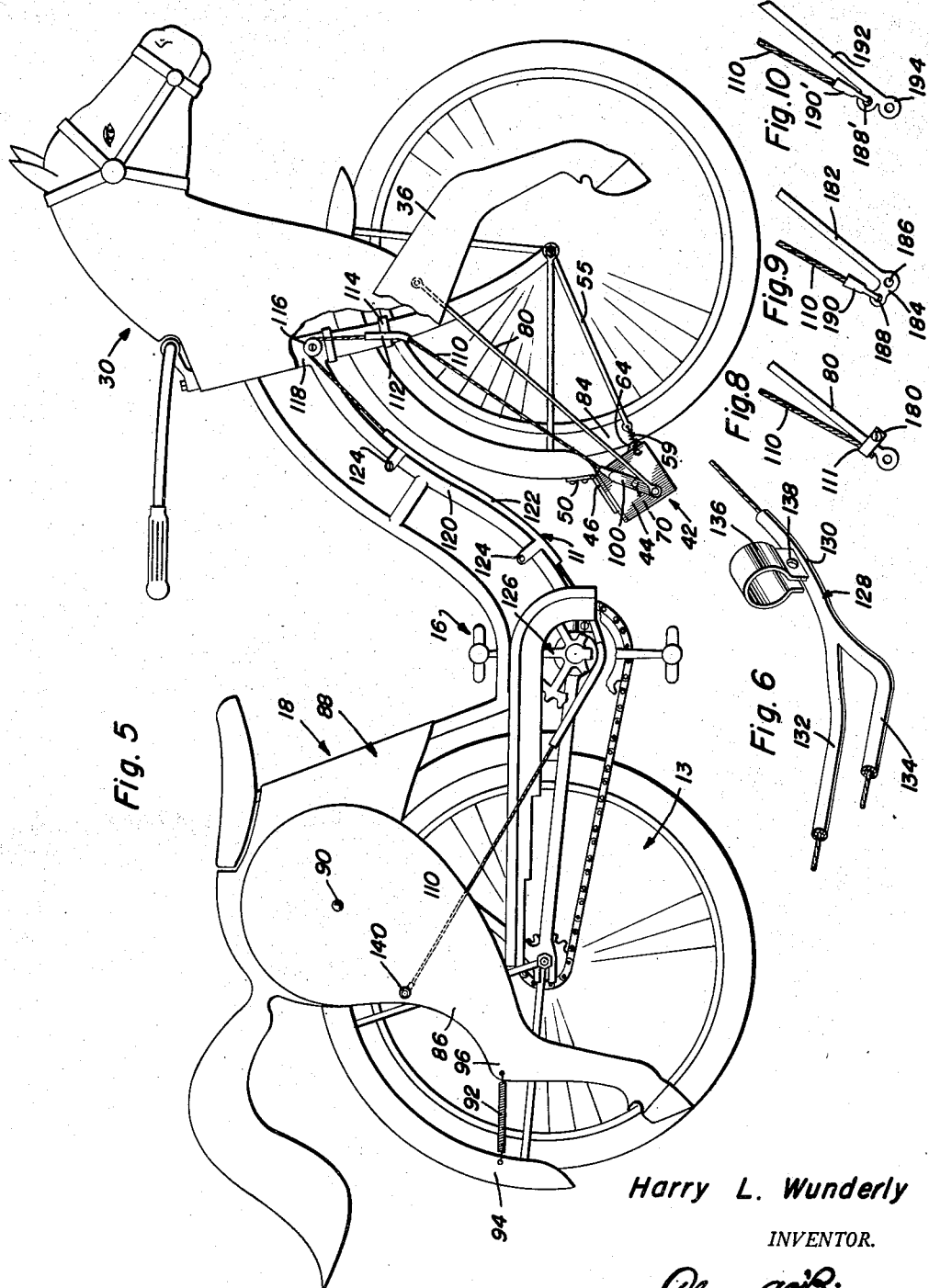
Harry L. Wunderly
INVENTOR.

Patented June 3, 1952

2,599,309

UNITED STATES PATENT OFFICE 2,599,309

ANIMAL FORM ATTACHMENT FOR BICYCLES

Harry L. Wunderly, Cuyahoga Falls, Ohio

Application April 16, 1951, Serial No. 221,290

11 Claims. (Cl. 280—1.202)

The present invention relates to amusement devices and more particularly to attachments for bicycles, the attachment comprising a pair of sections simulating front and rear animal portions for attachment to the front and rear portions of a conventional bicycle.

An object of the present invention is to provide an animal form attachment for bicycles or the like wherein the front and rear simulated animal portions have simulated legs pivotally secured thereto with means actuated in response to movement of the bicycle for effecting pivoting movement of the animal legs to give the attachment a life-like appearance.

A further object of the present invention is to provide a drive means attachment for securing to the mud guard of the front wheel with lever means interconnecting the drive means to the front and rear leg elements for effecting pivoting movement thereof.

Still another object of the present invention is to provide a novel arrangement of linkage means whereby the pivoting movement of the rear legs is effected through an interconnecting means operated by rotation of the front wheel, the interconnecting means permitting steering of the bicycle.

Various other objects and advantages will become apparent from the detailed description to follow. The best forms in which I have contemplated applying my invention are clearly illustrated in the accompanying drawings, wherein:

Figure 1 is a side elevational view of a first form of an animal form attachment for bicycles, wherein only the front leg elements of the attachment are pivotally movable;

Figure 2 is a top plan view of Figure 1;

Figure 3 is a detail view showing the drive means, partly in section, which is attached to the lower rear end portion of the front mudguard;

Figure 4 is a top plan view of the drive means showing portions of the interconnecting means for the front and rear leg elements secured to the levers of the drive means;

Figure 5 is a side elevational view of a modified form of animal form attachment for bicycles, wherein both the front and rear leg elements are pivotally mounted on the front and rear animal portions;

Figure 6 is a detail perspective view of the bracketed guide attachment for the interconnecting means of the rear leg elements whereby the leg elements on each side of the rear wheel of the bicycle can be simultaneously pivoted;

Figure 7 is a detail plan view of a modified form of drive means, parts being broken away;

Figure 8 is a view of a portion of a modified form of connecting rod;

Figure 9 is a view of a portion of a second modified form of connecting rod; and Figure 10 is a view of a portion of a third modified form of connecting rod.

Referring more particularly to the drawings, wherein like numerals designate like parts throughout, the numeral 10 designates generally a conventional bicycle having a front portion 12 comprising the steering wheel and handlebar, rear portion 14 including the rear wheel and frame with the pedal actuating means 16.

The animal form attachment for the bicycle is comprised of a rear portion 18 which simulates the hind portion of a horse having a pair of legs 20 and 22 and a tail 24. The hind portion has a cut-out at 26 which is disposable about the seat 28 of the bicycle to give the appearance that the seat 28 is a saddle for the horse.

The attachment also comprises a front portion 30 simulating the horse's head, 32, body 34 and front leg elements 36 and 38. The leg elements 36 and 38 are pivotally secured to the body 34 by means of the pin 40.

The drive means 42 for the front leg elements 36 and 38 is comprised of a housing 44 as best shown in Figure 3, which is of rectangular cross-section and formed of sheet metal or the like. The housing 44 has an attaching bracket 46 secured to the upper wall 48, the bracket being provided with a hingedly connected portion 50 with apertures 52 therein whereby the housing 44 can be hingedly secured to the lower rear end of the front mudguard of the bicycle designated by the numeral 54. Screws or the like may be inserted through the openings 52 for securing the housing 44 to the mudguard 54. A pair of rods 55 and 51 are pivotally carried by the front wheel axle of the bicycle and resiliently connected to the side walls of the housing 44 by means of the tension springs 59 and 61.

The front wall of the housing 44 has an opening therein at 58 and a roller 60 is rotatably supported by the housing 44 or the pin 62 which extends through the side walls of the housing. The roller 60 has a friction covering 64 thereon so that the portion of the roller extending through the opening 58 may be engaged with the surface of the tire 66 of the bicycle. A second roller 68 is rotatably supported by the housing 44, the pin 70 extending through the side walls of the housing and fixedly secured to the roller 68 for rotation therewith. The second roller 68 is also formed with a friction covering 72 which is engageable with the friction covering 64 of the first roller 60, whereby rotation of the first roller will effect rotation of the second roller. The second roller has a pair of levers 74 secured to the pins 70 at its outer ends for rotation therewith. The outer ends of the levers 74 are apertured at 76 for a reason to be presently understood.

Connecting rods 78 and 80 are pivotally secured to the upper intermediate portions of the front leg elements 36 and 38 by means of the pins 82. The opposing ends of the connecting rods 78 and 80 are pivotally secured to the levers 74 by means of pins 84 extending through the openings 76 in the levers 74.

It will thus be seen that as the bicycle is pedaled forwardly over the surface S, rotation of the front wheel will effect rotation of the first roller whereby the front leg elements 36 and 38 will be pivoted to simulate the leg movement of a horse.

Figure 7 shows a modified form of drive means which includes the friction roller 60' provided with a friction covering 64' for frictional engagement with the tire of the front wheel of the bicycle. The shaft 62' for the roller 60' has a pinion 63 fixedly secured thereto and the shaft 70' has a gear 71 secured thereto and enmeshed with the pinion 63 whereby rotational movement can be imparted to the levers 74' upon rotation of the roller 60'. Of course, the levers 74' can be interconnected with the leg elements for imparting movement thereto.

In the form shown in Figure 5, the front simulated animal portion 30 is a duplicate of that shown in Figure 1 and operates in substantially the same manner as set forth hereinabove. However, the rear animal portion 18' differs from that shown in the form of Figure 1, in that the rear leg elements 86 are pivotally supported by the body portion 88 by means of the pin 90 extending through the body portion 88. The rear leg elements 86 are normally urged to their rearmost position by means of the tension springs 92 connecting the lower end portion of the rear fender 94 to the central portion 96 of the leg elements.

The means for effecting pivoting movement of the rear leg elements is comprised of substantially the same drive means 42 as hereinabove described in connection with the form of Figure 1. However, additional interconnecting means 11 is provided for imparting pivoting movement to the rear leg elements in response to rotation of the drive means 42.

As seen best in Figure 4, the drive means 42 has a pair of cranks 73 secured to the outer ends of the pin 70. The connecting rods 78 and 80 are pivotally carried by the outer ends of the cranks at 102 and 104. The cable connectors 110 are each secured at one end to the bight portions 83 of cranks 73. Alternatively, cable connections are made on the connecting rods 78 and 80 above and near their openings for pins 84, as seen best in Figures 8, 9 and 10. In Figure 8, the connecting rod 80 is shown as provided with a C-clamp 180 for connecting the cable end 111 to the rod 80. Figure 9 discloses a modified form of connecting rod 182 provided with a double eyelet at 184, one of the eyelets 186 receiving a pin for connection to one of the levers 74, and the other eyelet 188 being adapted to receive the connector 190 on the cable 110. In this form, the two eyelets 186 and 188 lie along an axis perpendicular to the longitudinal axis of the connecting rod 182. In the form shown in Figure 10, the second eyelet 188' is integrally formed with the connecting rod 192 at a point inwardly of the eyelet 194 and adapted to receive the connector 190' for the cable 110. A pair of cables 110 extend from the points of connection and through the guide tubes 112 mounted on the fork of the bicycle by the sleeve 114. The cables 110 then pass over pulley sheaves 116 rotatably supported on the frame of the bicycle at 118 and from there extend downwardly along the frame bar 120, as a single cable or a double cable, through the tubular element 122 secured to the bar 120 by means of the split brackets 124.

The cables 110 then extend behind the sprocket wheel 126 and individually through the Y-shaped tubular element 128.

The tubular element 128 is best shown in Figure 6 as comprising a first arcuated portion 130 and a pair of arcuated portions 132 and 134 extending therefrom to provide a Y-shaped means for guiding the cables 110 to each side of the rear wheel 13. A C-clamp 136 is integrally secured to the arcuated portion 130 and has an opening 138 therethrough for receiving a screw or the like whereby the tubular element 128 may be secured to the bar 120 of the frame of the bicycle.

The cables 110 have their free end portions connected to intermediate portions of the hind leg elements 86 on the pins 140.

It will thus be seen that at the same time the front leg elements 36 and 38 are pivoted in response to rotation of the front wheel, the hind leg elements 86 will be pivoted in response to reciprocating movement of the cable 110 effected by rotation of the levers 74 of the drive means 42. Of course, the positioning of the connections to the front and hind leg elements will determine the arc through which the leg elements pivot in response to reciprocation of the cable 110 and connecting rods 78 and 80.

Looking now at Figure 2, the construction of the animal form attachment will be readily seen to comprise a pair of flat members 142 and 144 resembling the hind portion of a horse. The members 142 and 144 are secured together by means of the spacing elements 146, 148 and 150. Similarly, the front animal portion 30 is comprised of a pair of flat members 152 and 154 connected by spacing brackets 156 and 158.

Of course, various mechanical substitutions can be made without departing from the spirit of the present invention. The only change that would be required to change the leg motion from a gallop to a trot would be to have the link elements extending in directions opposite to each other.

For other leg motions such as the "walk," the additional crank arms 98 and 100 are essential for effecting movement of the cables 110 and rods 78 and 80, the cranks 73 extending in opposite directions. Such movement could also be accomplished by crossing the cables to the movable hind leg elements.

Having thus described my invention, what I claim to be new is:

1. An animal form attachment for bicycles comprising simulated front and rear animal portions mounted on the front and rear portions of a bicycle, said front animal portion having leg elements pivotally secured thereto, and drive means connected to said leg elements for effecting pivoting movement thereof in response to rotation of the front wheel of the bicycle, said means including a first roller rotatably supported by the bicycle, and engageable with the front wheel, a second roller frictionally engaging said first roller for rotation thereby and supported by the bicycle, and linkage means interconnecting said second roller to said leg elements for effecting the pivoting movement.

2. An animal form attachment for bicycles comprising simulated front and rear animal portions mounted on the front and rear portions of a bicycle, said front animal portion having leg elements pivotally secured thereto, and drive means connected to said leg elements for effecting pivoting movement thereof in response to rotation of the front wheel of the bicycle, said means including a first roller rotatably supported by the bicycle, and engageable with the front wheel, a second roller frictionally engaging said first roller for rotation thereby and supported by the bicycle, and linkage means interconnecting said second roller to said leg elements, said linkage means including oppositely extending levers secured to opposing sides of said roller, and cables connecting said levers to said leg elements.

3. An animal form attachment for bicycles comprising simulated front and rear animal portions mounted on the front and rear portions of a bicycle, said front animal portion having leg elements pivotally secured thereto, and drive means connected to said leg elements for effecting pivoting movement thereof in response to rotation of the front wheel of the bicycle, and said rear animal portion having hind leg elements pivotally secured thereto, and common drive means for said front and hind leg elements for effecting pivoting movement thereof in response to rotation of one of the wheels of the bicycle, said common drive means including a first roller rotatably supported by the bicycle and engageable with the front wheel, a second roller frictionally engaging said first roller for rotation thereby and supported by the bicycle, and linkage means interconnecting said front and rear leg elements for effecting the pivoting movement.

4. An animal form attachment for bicycles comprising simulated front and rear animal portions mounted on the front and rear portions of a bicycle, said front animal portion having leg elements pivotally secured thereto, and drive means connected to said leg elements for effecting pivoting movement thereof in response to rotation of the front wheel of the bicycle, and said rear animal portion having hind leg elements pivotally secured thereto, and common drive means for said front and hind leg elements for effecting pivoting movement thereof in response to rotation of one of the wheels of the bicycle, said common drive means including a first roller rotatably supported by the bicycle and engageable with the front wheel, a second roller frictionally engaging said first roller for rotation thereby and supported by the bicycle, and linkage means interconnecting said front and rear leg elements, said linkage means including oppositely extending cranks secured to opposing sides of said roller, and cables connecting said cranks to said leg elements.

5. An animal form attachment for bicycles comprising simulated front and rear animal portions mounted on the front and rear portions of a bicycle, said front animal portion having leg elements pivotally secured thereto, and drive means connected to said leg elements for effecting pivoting movement thereof in response to rotation of the front wheel of the bicycle, said drive means including a housing hingedly supported on the lower end of the front wheel mudguard of the bicycle, a friction roller rotatably carried by said housing and engageable with the tire of the front wheel, means for resiliently maintaining the housing with the roller in rolling contact with the front tire, and means interconnecting said roller with said leg elements for effecting pivoting movement thereof.

6. An animal form attachment for bicycles comprising simulated front and rear animal portions mounted on the front and rear portions of a bicycle, said front animal portion having leg elements pivotally secured thereto, and drive means connected to said leg elements for effecting pivoting movement thereof in response to rotation of the front wheel of the bicycle, said drive means including a housing hingedly supported on the lower end of the front wheel mudguard of the bicycle, a friction roller rotatably carried by said housing and engageable with the tire of the front wheel, means for resiliently maintaining the housing with the roller in rolling contact with the front tire, and means interconnecting said roller with said leg elements for effecting pivoting movement thereof, said last-named means including a pinion connected for rotation with said roller, a gear rotatably carried by said housing and enmeshed with said pinion, cranks secured for rotation with said gear, and connecting rods interconnecting said cranks with the leg elements.

7. An animal form attachment for bicycles comprising simulated front and rear animal portions mounted on the front and rear portions of a bicycle, said front animal portion having leg elements pivotally secured thereto, said rear animal portion having hind leg elements pivotally secured thereto, and drive means connected to said leg elements and operative in response to rotating movement of one wheel of the bicycle to effect pivoting movement of said leg elements, said drive means including a housing hingedly supported on the lower end of the front wheel mudguard of the bicycle, a friction roller rotatably carried by said housing and engageable with the tire of the front wheel, means for resiliently maintaining the housing with the roller in rolling contact with the front tire, and means interconnecting said roller with said leg elements for effecting pivoting movement thereof.

8. An animal form attachment for bicycles comprising simulated front and rear animal portions mounted on the front and rear portions of a bicycle, said front animal portion having leg elements pivotally secured thereto, said rear animal portion having hind leg elements pivotally secured thereto, and drive means connected to said leg elements and operative in response to rotating movement of one wheel of the bicycle to effect pivoting movement of said leg elements, said drive means including a housing hingedly supported on the lower end of the front wheel mudguard of the bicycle, a friction roller rotatably carried by said housing and engageable with the tire of the front wheel, means for resiliently maintaining the housing with the roller in rolling contact with the front tire, and means interconnecting said roller with said leg elements for effecting pivoting movement thereof, said last-named means including a pinion connected for rotation with said roller, a gear rotatably carried by said housing and enmeshed with said pinion, cranks secured for rotation with said gear, and connecting rods interconnecting said cranks with the leg elements.

9. An animal form attachment for bicycles comprising simulated front and rear animal portions mounted on the front and rear portions of a bicycle, said front animal portion having leg elements pivotally secured thereto, said rear animal portion having hind leg elements pivotally secured thereto, drive means connected to said leg elements and operative in response to rotating movement of one wheel of the bicycle to effect pivoting movement of said leg elements, said drive means including a housing hingedly supported on the lower end of the front wheel mudguard of the bicycle, a friction roller rotatably carried by said housing and engageable with the tire of the front wheel, means for resiliently maintaining the housing with the roller in rolling contact with the front tire, means interconnecting said roller with said leg element for effecting pivoting movement thereof, said last-named means including a pinion connected for rotation with said roller, a gear rotatably carried by said housing and enmeshed with said pinion, cranks secured for rotation with said gear, connecting rods interconnecting said cranks with the front leg elements, and cables interconnecting said connecting rods with said hind leg elements.

10. The combination of claim 9 wherein said bicycle front portion has pulley sheaves rotatably mounted thereon, said cables passing over said sheaves.

11. The combination of claim 9 including resilient means attached to said rear portion of the bicycle and said hind leg elements normally biasing said hind leg elements to their rearmost position.

HARRY L. WUNDERLY.

REFERENCES CITED

The following references are of record in the file of this patent:

UNITED STATES PATENTS

| Number | Name | Date |
| --- | --- | --- |
| D. 164,758 | Bader | Oct. 9, 1951 |
| 1,863,393 | Brennan | June 14, 1932 |
| 2,044,889 | Ralston | June 23, 1936 |
| 2,225,560 | Hartman | Dec. 17, 1940 |
| 2,256,052 | La Bille | Sept. 16, 1941 |
| 2,527,684 | Moroney | Oct. 31, 1951 |

FOREIGN PATENTS

| Number | Country | Date |
| --- | --- | --- |
| 164,572 | Switzerland | Dec. 16, 1933 |
| 374,346 | Great Britain | June 9, 1932 |